(12) United States Patent
Funamoto et al.

(10) Patent No.: US 6,926,415 B2
(45) Date of Patent: Aug. 9, 2005

(54) REFLECTIVE PLATE, METHOD OF MAKING SAME, AND REFLECTIVE TYPE LIQUID CRYSTAL DISPLAY USING THE REFLECTIVE PLATE

(75) Inventors: Akihiro Funamoto, Osaka (JP); Shigeru Aoyama, Kyoto (JP)

(73) Assignee: Omron Corporation (JP)

(*) Notice: Subject to any disclaimer, the term of this patent is extended or adjusted under 35 U.S.C. 154(b) by 72 days.

(21) Appl. No.: 10/425,020

(22) Filed: Apr. 28, 2003

(65) Prior Publication Data
US 2003/0214739 A1 Nov. 20, 2003

(30) Foreign Application Priority Data
Apr. 30, 2002 (JP) ........................................ 2002-128511

(51) Int. Cl.$^7$ ................................................ G02B 5/08
(52) U.S. Cl. ........................ 359/851; 359/575; 349/113
(58) Field of Search ................................ 359/850, 883, 359/565, 566, 569, 571, 574, 575, 627, 459, 851; 349/113, 193, 201

(56) References Cited

U.S. PATENT DOCUMENTS

| | | | | |
|---|---|---|---|---|
| 3,806,232 A | * | 4/1974 | Gray | ........................ 359/851 |
| 4,696,554 A | * | 9/1987 | Seawright | ................... 359/853 |
| 5,285,314 A | * | 2/1994 | Futhey | ....................... 359/565 |
| 5,601,957 A | * | 2/1997 | Mizutani et al. | .............. 430/22 |
| 6,473,145 B1 | * | 10/2002 | Shim et al. | ................. 349/113 |
| 6,847,425 B2 | * | 1/2005 | Tanada et al. | ............... 349/113 |
| 6,856,366 B2 | * | 2/2005 | Matsushita et al. | ......... 349/113 |

* cited by examiner

*Primary Examiner*—Thong Nguyen
*Assistant Examiner*—Arnel C. Lavarias
(74) *Attorney, Agent, or Firm*—Osha Liang LLP

(57) ABSTRACT

A metal die having a reverse pattern of a irregular surface in which a height of a convex increases from the center toward the outer periphery is pressed onto a surface of a molding resin on a substrate. A total volume of convexes protruding from a cutting plane and a total volume of concaves depressed below the cutting plane coincide with each other over all of the metal die as a whole, so that it is possible to form the irregular surface on a reflective plane with good precision. A reflective film such as an aluminum film is provided on a surface of an uneven layer formed in such a manner, thereby obtaining a reflective plate having high light-collecting performance in a direction toward the center. As a result, it is possible to provide a reflective plate capable of collecting reflected light in a specified direction and of being formed with good precision by embossing, a method of making same, and a reflective type liquid crystal display having the reflective plate.

11 Claims, 12 Drawing Sheets

PRIOR ART

PRIOR ART

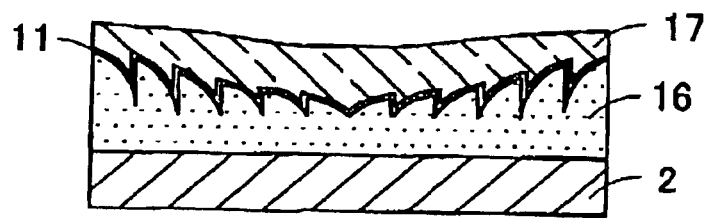
Fig. 5A
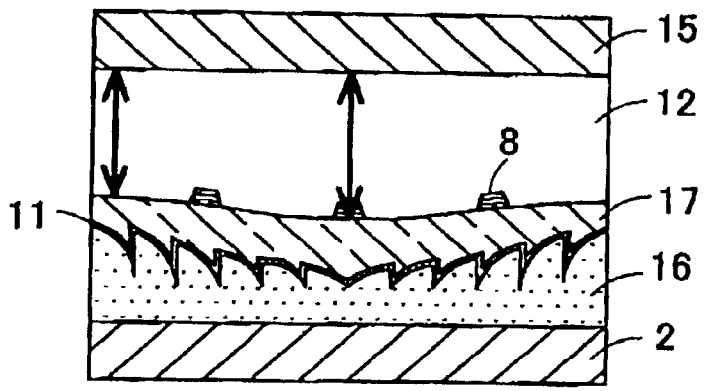
Fig. 5B
Fig. 6
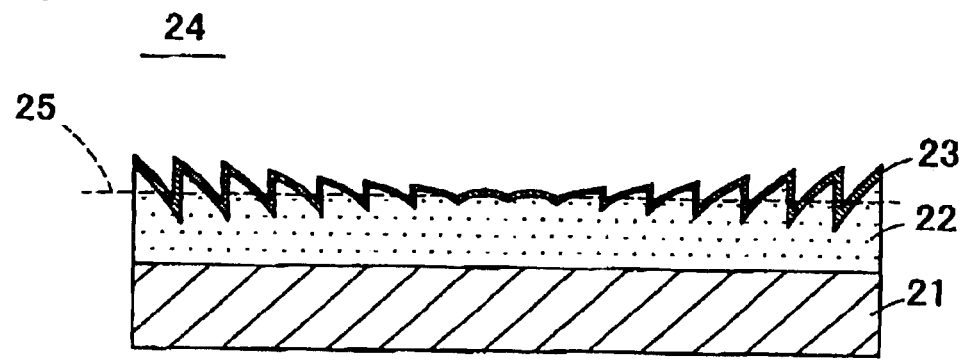

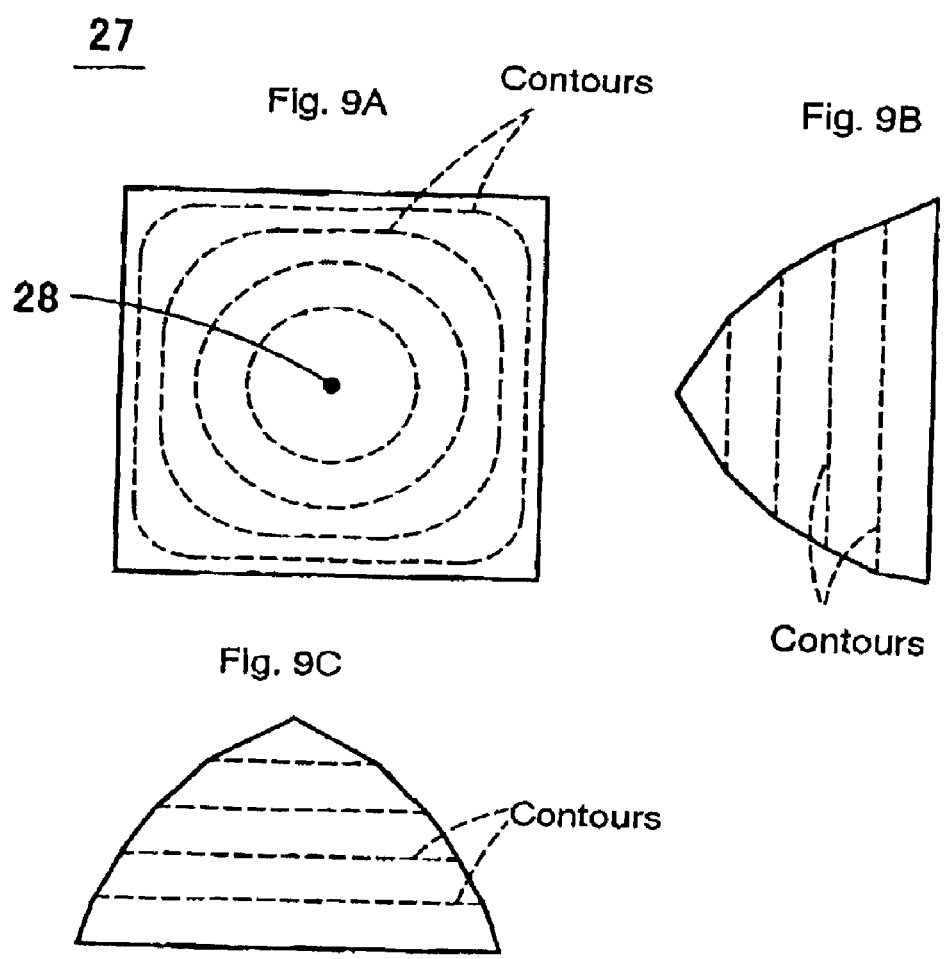

27

24

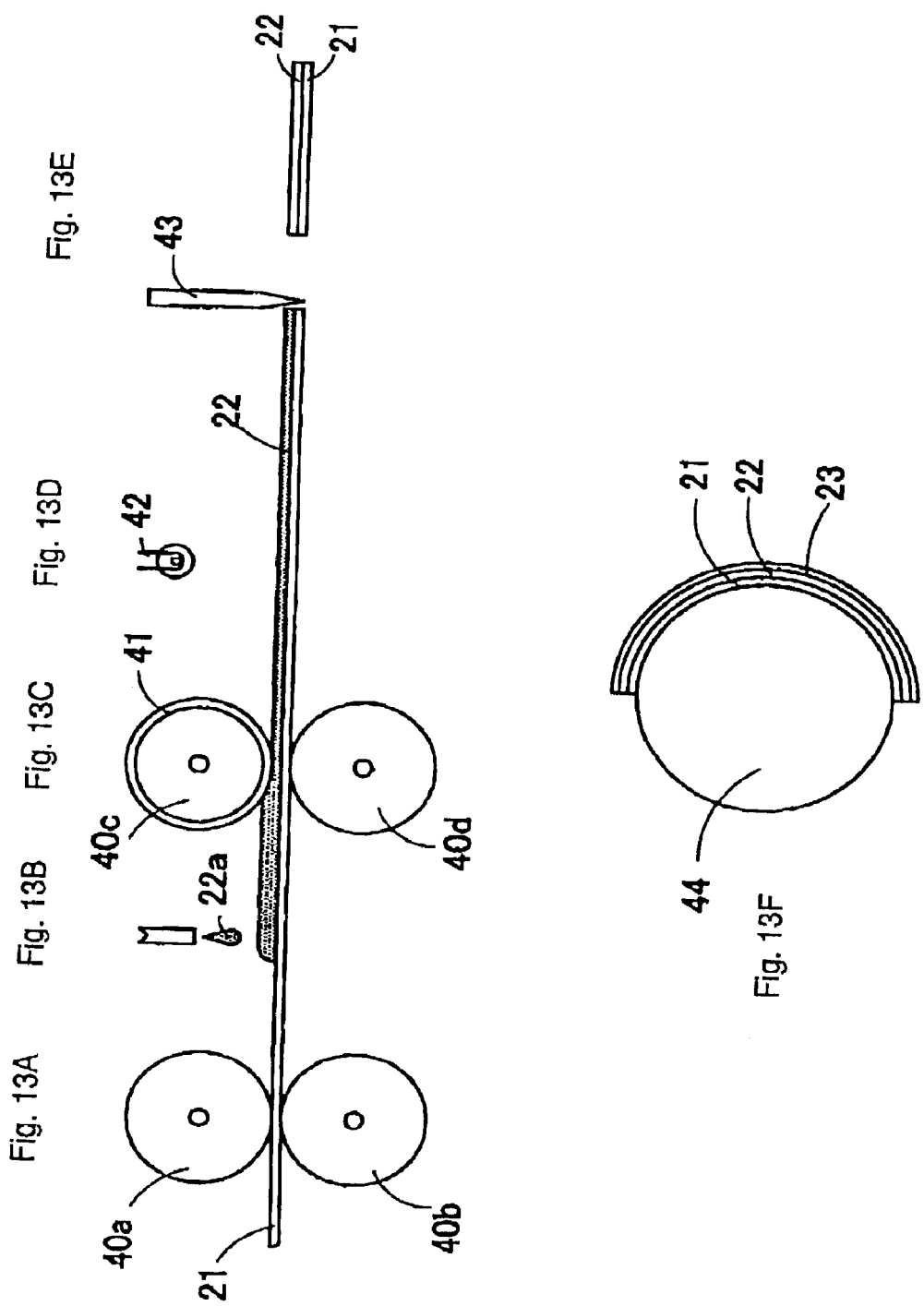

REFLECTIVE PLATE, METHOD OF MAKING SAME, AND REFLECTIVE TYPE LIQUID CRYSTAL DISPLAY USING THE REFLECTIVE PLATE

BACKGROUND OF THE INVENTION

1. Field of the Invention

The present invention relates to a reflective plate used in a reflective type liquid crystal display, a method of making same, and the reflective type liquid crystal display.

2. Description of the Related Art

In recent years, demands have been built up for downsizing, reduced power consumption and cost down of a device equipped with a liquid crystal display, such as a personal computer, a television set, a digital video camera, a digital camera and the like. In order to meet such demands, development has been progressed of a reflective type liquid crystal display using reflection of incident light from outside instead of a back light for illumination of a liquid crystal panel.

FIG. 1 shows a schematic sectional view of a structure of a conventional reflective type liquid crystal display. A liquid crystal display 1 includes an insulated substrate 2, an uneven layer 16, a reflective film 11, a leveling layer 17, a TFT 8, a pixel electrode 18, a liquid crystal layer 12, a transparent common electrode 19, a color filter 14 and a transparent insulated substrate 15. Furthermore, the TFT 8 is formed of a source electrode 6, a drain electrode 7, a semiconductor layer 5, a gate insulated film 4 and a gate electrode 3.

The uneven layer 16 can be formed with ease by embossing, in which irregular surface is shaped by pressing a die having a reverse pattern thereon. More specifically, as shown in FIG. 2A, resin 16a such as acrylic resin is coated on the insulated substrate 2 and a metal die 20 having irregular surface thereon is pressed onto the resin 16a at a temperature of not less than a glass transition point to less than a melting point (FIG. 2B) Thereafter, the resin 16a is hardened, followed by removal of the metal die 20 to complete the uneven layer 16 shown in FIG. 2C. A reflective film 11 is formed by vacuum evaporating a high reflective metal thin film that is for example aluminum onto a surface of the uneven layer (FIG. 2D).

The leveling layer 17 can be formed on an upper surface of the reflective film 11 by spin coating, for example, a polyimide resin (FIG. 2E).

On the other hand, in the reflective type liquid crystal display as described above, it is important how efficiently to use peripheral light in order to raise a luminance on a liquid crystal screen. Hence, as shown in FIG. 3, a method has been tried with which light-collecting performance of reflective light is enhanced, by that a slope of a convex formed on the uneven layer 16 becomes steeper from the center on the reflective plate toward the outer periphery and, simultaneously, a height of the convex is also increased in the same direction, while a global shape of the reflective surface is formed like a parabolic line.

If the uneven layer 16 having this shape is, as shown FIG. 4A, tried to be shaped by embossing, the metal die 20 could not be pressed into the uneven layer 16 deeper when shallow recesses formed in the central area of the metal die 20 is filled with the resin to the full. Therefore, a wrong shape is, as shown in FIG. 4C, formed on the surface of the uneven layer 16. It is understood that, as a result, the uneven layer 16 having the shape as shown in FIG. 3 cannot be formed with good precision by embossing.

Even if the reflective surface with the shape shown in FIG. 3 was able to be formed in a different method, the leveling layer 17 formed on the reflective film 11 with a spin coating method would inevitably depress at the central area below the peripheral area thereof as shown in FIG. 5A. If the TFT 8, liquid crystal layer 12, transparent insulated substrate 15 and the like, as shown in FIG. 5B, are formed in this state, a cell gap in the central area of the transparent insulated substrate 15 is different from one in the peripheral area thereof. Therefore, an interference condition alters according to a position on the transparent substrate 15, which causes a mottled pattern to thereby drastically degrade a display quality of a liquid crystal display.

SUMMARY OF THE INVENTION

The present invention has been made in light of the above problem and it is an object thereof to provide a reflective plate having an irregular surface pattern consisted of concaves and convexes formed by embossing or the like with precision A reflective plate according to the present invention includes: a flat bottom plane; and a reflective plane opposing to the bottom plane and having a surface consisted of concaves and convexes, wherein heights of the convexes or depths of the concaves are not uniform, and when the reflective plane is cut with a cutting plane substantially parallel to the bottom plane, a total volume of the convexes protruding from the cutting plane and a total volume of the concaves depressed below the cutting plane are substantially equal to each other.

The irregular surface of the above-described reflective plate can be formed with good precision all over of the surface by embossing.

The height of the convex may increase from a certain position on the reflective plane toward the outer periphery thereof.

The certain position may be optionally provided on the reflective plane. Especially, the certain position is provided at the center of the reflective plane and the height of the convex increases from the center of the reflective plane toward the outer periphery thereof, so that peripheral light can be reflected in a direction toward the central area where an observer's eye is located. In other words, it is possible to obtain a reflective plate with high performance of collecting light.

Further, a reflective plate according to the present invention further includes: an irregular part for alignment, in which the total volume of the part protruding from the cutting plane and the total volume of the part depressed below the cutting plane are equal to each other, at the outer side of the reflective plane.

The above-described irregular part can be formed with good precision by embossing. The reflective plane and the irregular part for alignment can be simultaneously formed in a manufacturing process by having the cutting plane of the reflective plane and the cutting plane of the irregular part for alignment in common.

A reflective film may be provided on the upper surface of the reflective plane using a high reflective material. More specifically, it is preferable that the reflective film is formed with a high reflective metal such as aluminum and silver. Note that in a case where a metal die is directly pressed onto a metal with relatively high ductility such as aluminum to form a reflective plane, such a reflective film is not necessary.

A leveling layer may be provided on the reflective plane.

Since a reflective plane has an irregular surface, a thin film transistor (TFT) cannot be fabricated directly on the upper surface thereof. When a leveling layer formed on the reflective layer, the TFT or the like can be fabricated on the leveling layer.

A method of making a reflective plate according to the present invention includes the steps of: coating a resin on a substrate pressing a die having an irregular surface formed of concaves and convexes onto the resin to transfer the surface irregularities; hardening the resin; and removing the die from the resin, wherein in the die, heights of the convexes or depths of the concaves are not uniform, and when the reflective plane is cut with a cutting plane substantially parallel to the bottom plane, a total volume of the convexes protruding from the cutting plane and a total volume of the concaves depressed below the cutting plane are substantially equal to each other.

By performing embossing with the above-described die, since the concaves of the die are filled with resin pushed out by the convexes of the die almost without a clearance, an irregular surface can be formed all over the reflective plane with good precision.

As the above-described die, a roll may be used that has a reverse pattern on the surface thereof. That is, the surface of a roll is pressed onto the resin while rolling, thereby transferring the irregular surface on the resin.

The above-described method is suitable for mass production and can produce a number of reflective plates with high throughput. Furthermore, by forming a reflective plate in the form of a sheet with the above-described method, a reflective type liquid crystal display can be made thinner.

Note that the elements of the present invention described above can be combined as far as it is possible.

BRIEF DESCRIPTION OF THE DRAWINGS

FIGS. 5A and 5B show the reflective plate shown in FIG. 3 provided with a leveling layer, liquid crystal layer and others.

FIG. 6 shows a reflective plate according to the present invention.

FIGS. 9A, 9B and 9C show a plan view, side view and front view, respectively, of a convex that forms irregular pattern.

FIGS. 13A to 13F show an example of a manufacturing process of a reflective plate.

DESCRIPTION OF THE PREFERRED EMBODIMENTS

FIG. 6 shows a reflective plate 24 according to one embodiment of the present invention. The reflective plate 24 includes a substrate 21, an uneven layer 22 and a reflective film 23. The reflective plate 24 has a size equal to or larger than a liquid crystal panel of a liquid crystal display.

The uneven layer 22 includes a flat bottom plane and a reflective plane opposing to the bottom plane and having an irregular surface formed of concaves and convexes, wherein heights of the convexes or depths of the concaves are not uniform, and when the reflective plane is cut in a cutting plane substantially parallel to the bottom plane, a total volume of the convexes protruding from the cutting plane and a total volume of the concaves depressed below the cutting plane are substantially equal to each other.

More specifically, when the reflective plane of the uneven layer 22 are divided into plural areas, it is sufficient that cutting planes (each determined so that the total volume of convexes protruding from a cutting plane and the total volume of concaves depressed below the cutting plane are equal to each other) in areas are almost in one plane all over the reflective plane. Shapes of the areas are arbitrary and sizes of the areas are not necessarily equal to each other. When a small number of convexes are included in an area, the number of the convexes has to be an integer. When many convexes are included in an area and a fraction of convexes each partially included in the area is very small relative to the whole convexes, the number of the whole convexes is not necessarily an integer.

Figure 7A:
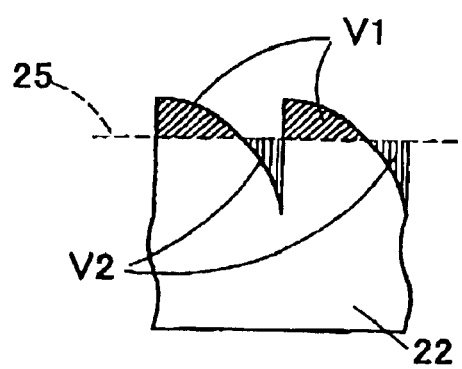
FIGS. 7A and 7B show partially enlarged views of a reflective plate according to the present invention.
Figure 7B:
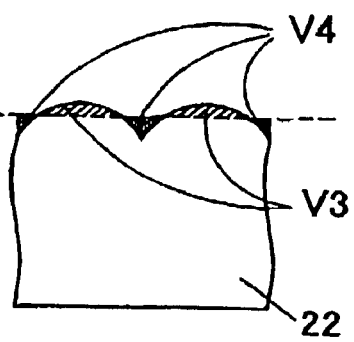

FIGS. 7A and 7B shows partially enlarged views of the uneven layer 22. In FIG. 7A, when a total volume of convexes (shown with oblique hatching) protruding from the cutting plane 25 almost parallel to the bottom plane of the uneven layer 22 is V1 and a total volume of concaves (shown with vertical hatching) depressed below the cutting plane 25 is V2 by definition, V1=V2. Furthermore, in FIG. 7B, when a total volume of convexes (shown with oblique hatching) protruding from the cutting plane 25 almost parallel to the bottom plane of the uneven layer 22 is V3 and a total volume of concaves (shown with vertical hatching) depressed below the cutting plane 25 is V4 by definition, V3=V4.

By cutting a reflective plane with a cutting plane almost parallel to the bottom plane of an uneven layer, a total volume of convexes protruding from the cutting plane and a total volume of concaves depressed below the cutting plane are almost equal to each other.

The uneven layer 22 with the above-described reflective plane can be formed by embossing with good precision.

Figure 8A:
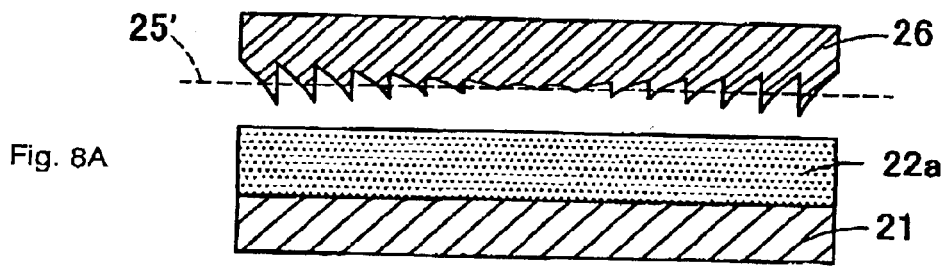
FIGS. 8A to 8C show the process where an uneven layer is formed by embossing.
Figure 8B:
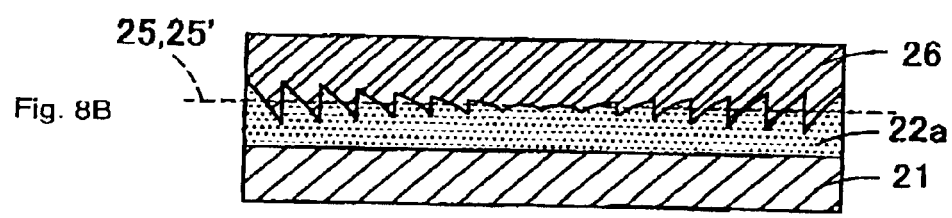
Figure 8C:
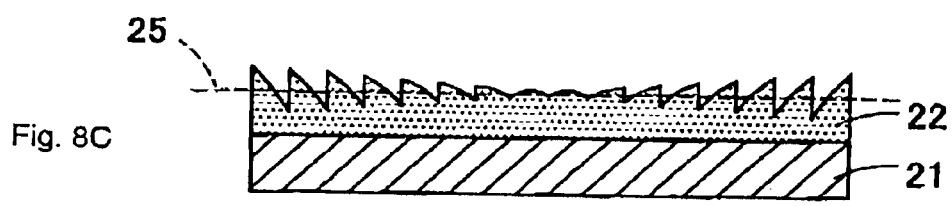

FIGS. 8A to 8C show a manufacturing process of the uneven layer 22. A reverse pattern of a reflective plane of the uneven layer 22 described above is formed on a metal die 26 shown in FIG. 8A, and a height of a convex on the uneven layer 22 increases from the center toward the outer periphery. Furthermore, the metal die 26 has a cutting plane 25' corresponding to the cutting plane 25 of the uneven layer 22. That is, when an irregular surface of the metal die 26 is cut with a cutting plane, a total volume of convexes protruding from the cutting plane and a total volume of concaves depressed below the cutting plane are almost equal to each other. More specifically, when the irregular surface of the metal die 26 are divided into plural areas, cutting planes (each determined so that a total volume of convexes protruding from a cutting plane and a total volume of concaves depressed below the cutting plane are equal to each other) for each area are almost in one plane all over the irregular surface of the metal die 26.

When the metal die 26 is pressed onto a molding resin 22a such as acrylic resin, the molding resin 22a is pushed out by convexes of the metal die 26, which are higher in height, and concaves with depths, which are deeper in depth, around the convexes are filled with the molding resin 22a pushed out.

Subsequent to this, the molding resin 22a is pushed out by convexes of the metal die 26, which are lower in height, and concaves with depths, which are shallower in depth, around the convexes are filled with the molding resin 22a pushed out. In this way, the concaves of the metal die 26 are filled with the resin pushed out by the convexes of the metal die 26 almost without a clearance with the result that the metal die 26 and the molding resin 22a stick to each other (FIG. 8B).

That is, when the metal die 26 is pressed against the molding resin 22a to the level of the cutting plane 25', a total volume of the resin pushed out by the convexes of the metal die 26 and a total volume of the resin necessary for forming the convexes on the reflective plane is equal. Therefore, by using the metal die 26 having the cutting plane 25' as described above, the reflective plane of the uneven layer 22 can be, as shown in FIG. 8C, formed with good precision.

As the uneven layer 22, it is made of an photo-curable resin, a polyolefin-based resin or the like.

Figure 10A:
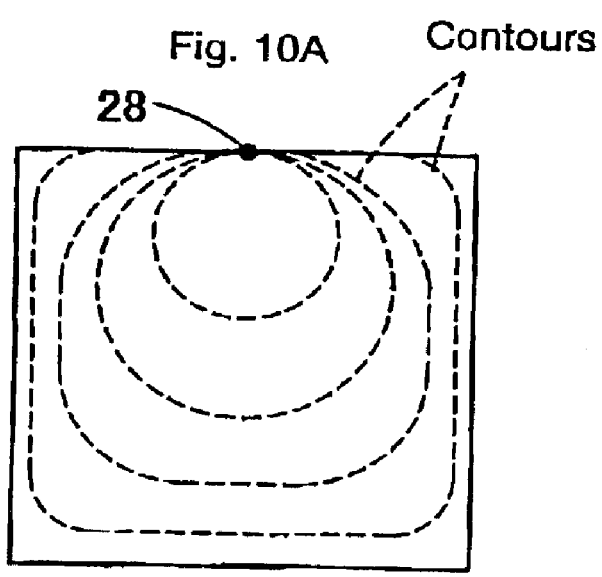
FIGS. 10A, 10B and 10C show a plan view, side view and front view, respectively, of another convex that forms irregular pattern.
Figure 10B:
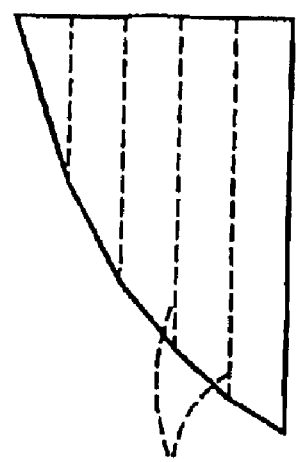
Figure 10C:
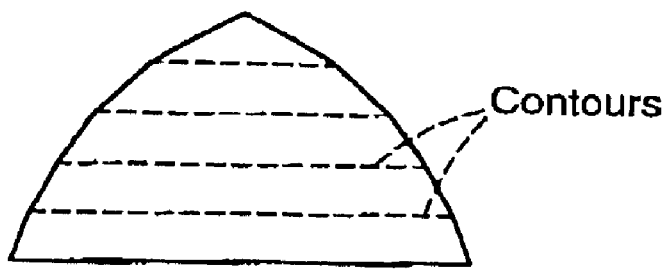

A shape of one protrusion that composes an irregular surface of the uneven layer 22 may be optional; substantially conical, substantially polygonal pyramidal or the like. FIGS. 9A to 9C and 10A to 10C show examples of a convex 27, and show plan views, side views and front views of the convex, respectively. Broken lines in the figures show contours. Since the protrusion 27 of FIGS. 9A to 9C has its vertex 28 at the center thereof, incident light directed to the protrusion 27 of FIG. 9A is reflected in any of upward, downward, leftward and rightward directions. Since the protrusion 27 of FIGS. 10A to 10C has its vertex at the edge thereof, incident light directed to the protrusion 27 of FIG. 10A is reflected in any of downward, leftward and rightward directions, though not in a normal direction to the sheet.

By changing a position of the vertex 28 of each protrusion 27 and a height thereof in this way, slopes of surfaces of the protrusion 27 change, directions of reflecting light can be varied.

Note that as far as total volumes of convexes and concaves separated by the cutting plane 25 are equal to each other as a whole, the convexes 27 may be arranged either periodically or at random. In order to avoid that an optical source is reflected on a screen and thereby an image becomes hard to be viewed, it is preferable that concaves and convexes are provided on a reflective plane densely so that the reflective plane has no flat area.

Concaves and convexes on a reflective plane are preferably designed so that reflecting light is concentrated and reflected in a specified direction such as a direction of observer's eyes. Furthermore, it is preferable to design a reflective plane according to characteristics of the apparatus. For example, for an apparatus in which operation buttons are located to the next of a liquid crystal screen, light can be reflected so that reflecting light illuminates the operation buttons.

Figure 1:
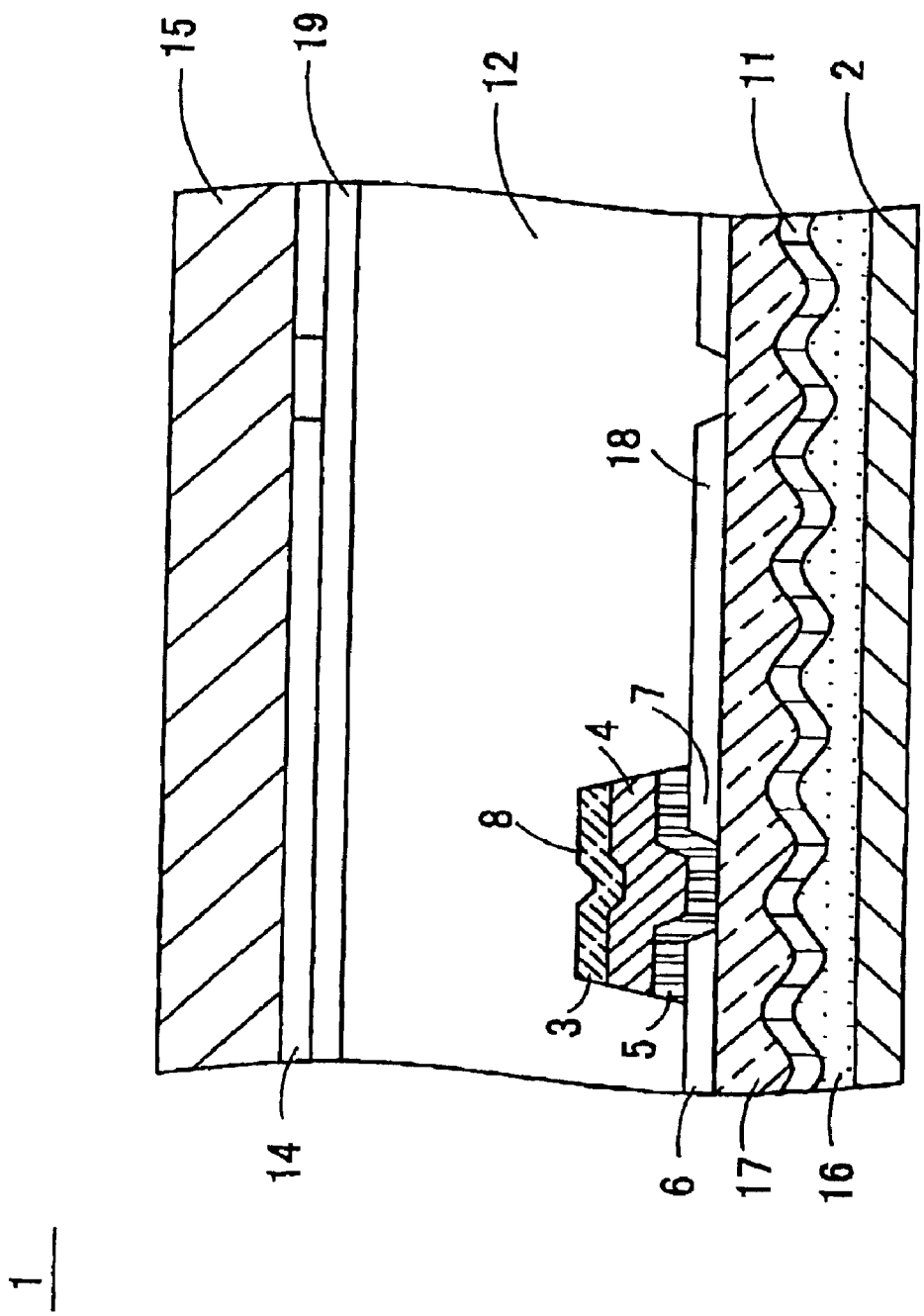
FIG. 1 shows a schematic sectional view of a structure of a conventional liquid crystal display.
Figure 2A:
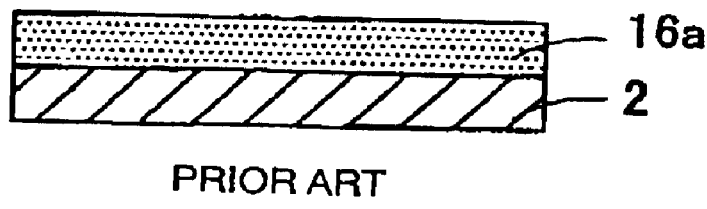
FIGS. 2A to 2E show a method of forming an uneven layer by embossing.
Figure 2B:
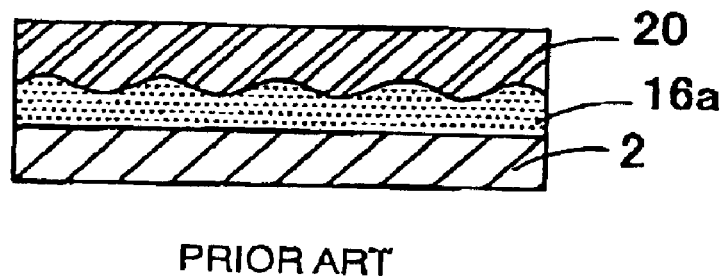
Figure 2C:
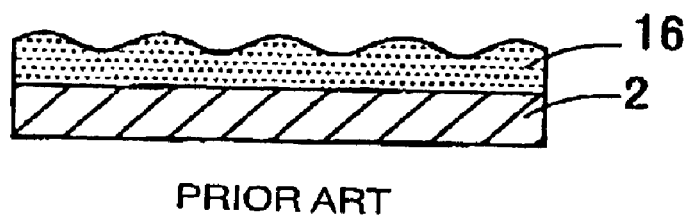
Figure 2D:
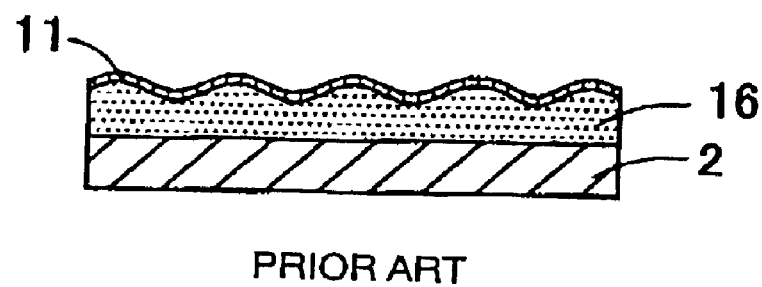
Figure 2E:
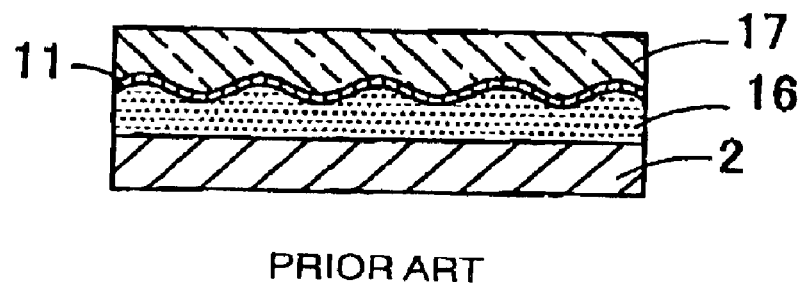
Figure 3:
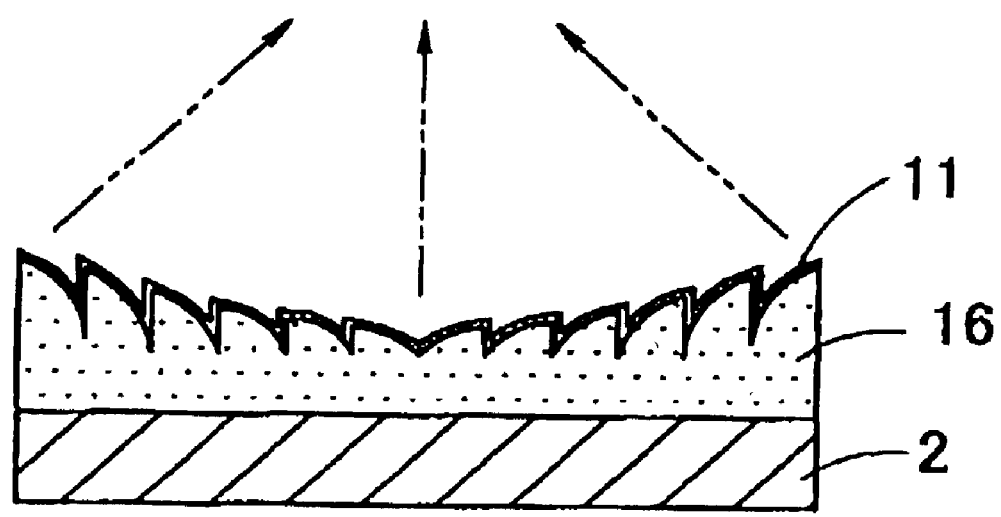
FIG. 3 shows the shape of a conventional reflective plate having a light-collecting function.
Figure 4A:
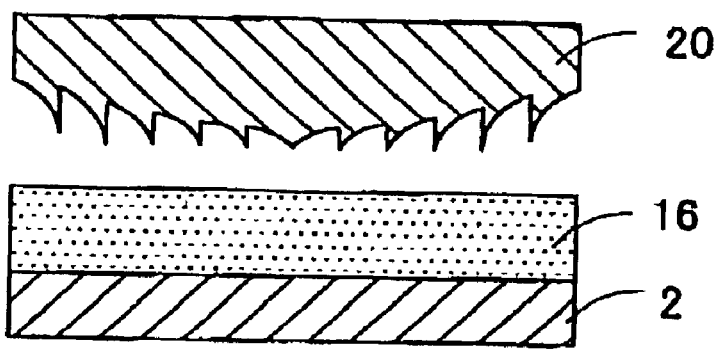
FIGS. 4A to 4C show the reason for impossibility of forming the reflective plate shown in FIG. 3 by embossing.
Figure 4B:
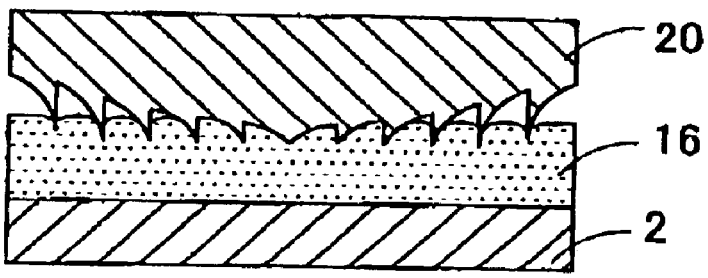
Figure 4C:
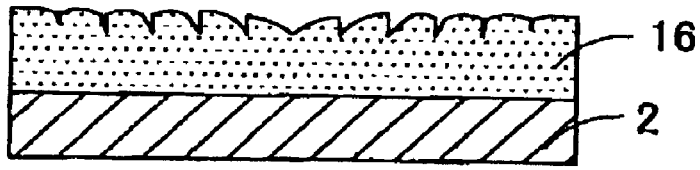
Figure 11A:
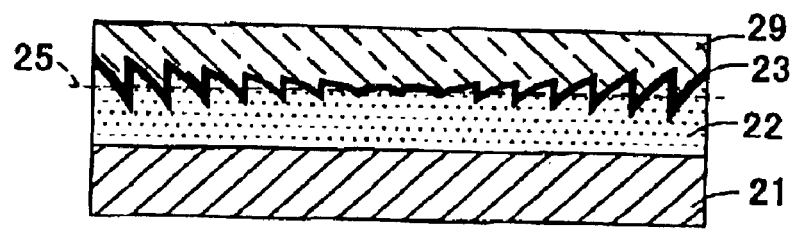
FIG. 11A shows a leveling layer provided on the reflective plate shown in FIG. 6.
Figure 11B:
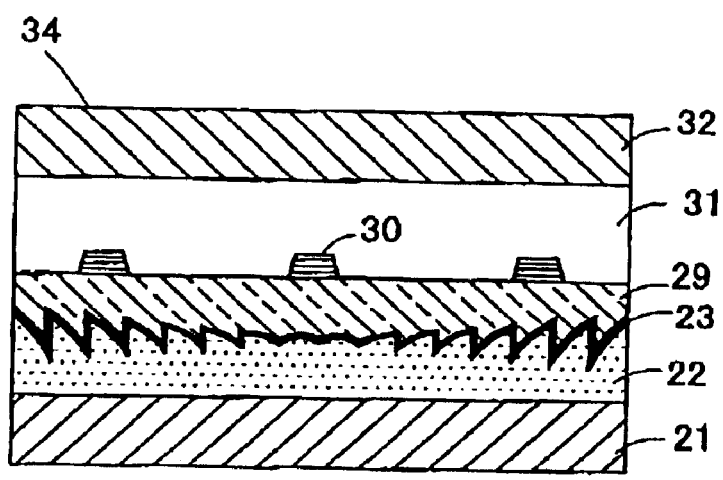
FIG. 11B shows a liquid crystal display using the reflective plate shown in FIG. 6.

FIG. 1A shows a reflective plate in which a leveling layer 29 is formed on a reflective film 23. The leveling layer 29 is formed with a spin coating method in which a pre-polymer in a state of a viscous liquid is coated on the reflective film 23 and the coat is extended with a spin coater and baked to be hardened. A surface of the leveling layer 29 becomes almost in parallel to a cutting plane 25. In addition, a TFT 30, a liquid crystal layer 31, a transparent substrate 32 and the like are, as shown in FIG. 11B, provided on and above the leveling layer 29. The distance between the surface of the leveling layer 29 and the transparent substrate 32 is constant, which enables a high quality liquid crystal display 34 without a mottled pattern.

Figure 12A:
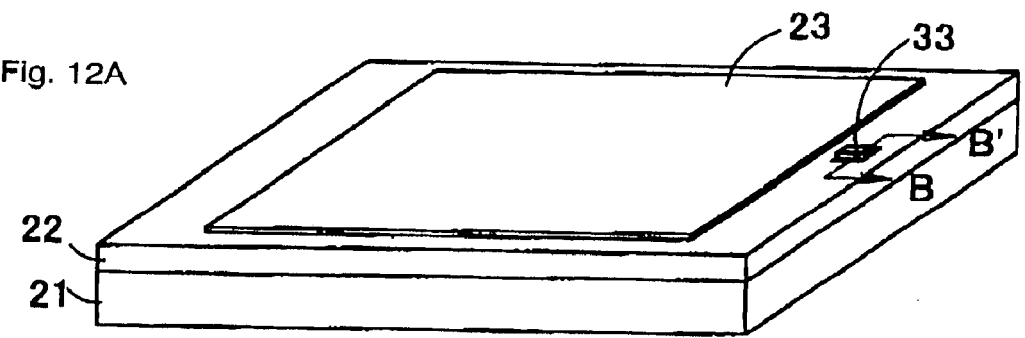
FIG. 12A shows an alignment mark provided on an uneven layer.

FIG. 12A shows a reflective plate 24 on which an alignment mark 33 for alignment is formed on the surface of the uneven layer 22 at some position other than an area working as a reflective plane. Note that the area working as a reflective plane means a plane in which the reflective film 23 is formed.

Figure 12B:
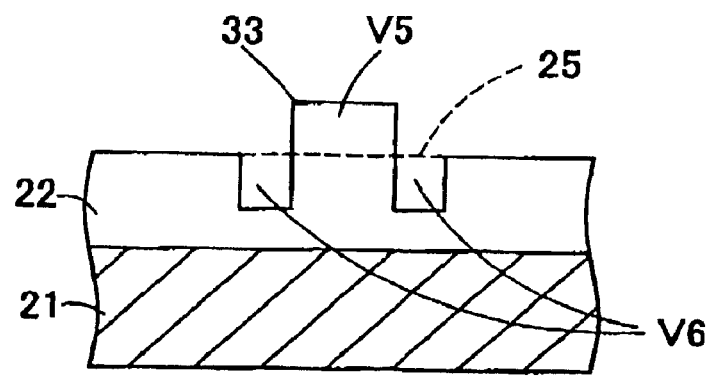
FIG. 12B is a sectional view taken along line B–B' of FIG. 12A.

FIG. 12B shows a sectional view taken along line B–B' of FIG. 12A. In the alignment mark 33, similar to an irregular surface of the uneven layer 22, a volume V5 of a convex protruding from the cutting plane 25 is equal to a total volume V6 of concaves depressed below the cutting plane 25 are equal to each other. Therefore, the alignment mark 33 can also be formed with good precision simultaneously with an irregular surface of a reflective plane by embossing.

FIGS. 13A to 13F show an example of a manufacturing process of the uneven layer 22. Rolls 40a. 40b, 40c and 40d are rotary rolls in the shape of a cylinder of a calendar-molding machine. The roll 40c is provided with a stamper 41 on its surface, and shapes of concaves and convexes similar to those on a metal die having the cutting plane 25' described above are carved on the surface of the stamper 41.

At first, a substrate 21 that is put between opposed rolls 40a and 40b is formed in the shape of a sheet. Ultraviolet curable type molding resin 22a is dropped uniformly on the substrate 21. Then, the shapes of concaves and convexes are formed on the molding resin 22a with the stamper 41 provided on the surface of the roll 40c (FIGS. 13A to 13C).

Subsequent to this, the uneven layer 22 is irradiated with ultraviolet from a ultraviolet irradiation apparatus 42 to be hardened (FIG. 13D) and the substrate 21 and the uneven layer 22 are cut with a cutter 43 (FIG. 13E). It is preferable that a size of a composite of the substrate 21 and the uneven layer 22 is on the same order of or larger than that of a panel of the reflective type liquid crystal display 34 and selected so as to be handled in the following steps with ease.

The composite of substrate 21 and the uneven layer 22 obtained by cutting is wound on a cylindrical support member 44 with the front surface of the uneven layer 22 exposed as the outer side (FIG. 13F) and, in this state, silver is evaporation deposited to a thickness of the order of 2000 angstroms thereon to form the reflective film 23.

By curving the uneven layer 22 in this way, since each of the concaves on the uneven layer 22 is widen, silver particles can be provided uniformly over the inner surface of each depression, thereby forming the reflective film 23 with a uniform thickness. Note that the reflective film 23 may be formed with a sputtering method.

According to the method of making a reflective plate of this embodiment, since the reflective plates 24 can be produced by continuous process steps, mass production is possible with very high throughput.

Note that by coating the surface of the reflective film 23 with a transparent resin or the like, the reflective plate 24 can be handled with ease and the reflective film 23 can be prevented from modification caused by oxidation or the like, or being damaged. Furthermore, the transparent substrate 32a and the reflective plate 24 are preferably adhered to each other with a transparent pressure-sensitive adhesive or the like so as to be integrated into one piece.

Furthermore, by forming the uneven layer 22 with compression molding of aluminum, it's not necessary to form the reflective film 23, which enables simplification of a manufacturing process.

What is claimed is:

1. A reflective plate having:

a flat bottom plane; and a reflective plane opposing to the bottom plane and having an irregular surface formed of concaves and convexes, wherein heights of the convexes or depths of the concaves are not uniform, and when the reflective plane is cut with a cutting plane substantially parallel to the bottom plane, a total volume of the convexes protruding from the cutting plane and a total volume of the concaves depressed below the cutting plane are substantially equal to each other.

2. The reflective plate according to claim 1, wherein the heights of the convexes increase from a certain position on the reflective plane toward the outer periphery thereof.

3. The reflective plate according to claim 1, further comprising:

an irregular part for alignment, in which the total volume of the part protruding from the cutting plane and the total volume of the part depressed below the cutting plane are equal to each other, at the outer side of the reflective plane.

4. The reflective plate according to claim 1, wherein a reflective film made of a high reflective material is provided on the upper surface of the reflective plane.

5. The reflective plate according to claim 1, further comprising:

a leveling layer for leveling the reflective plane.

6. A reflective type liquid crystal display comprising:

a reflective plate according to claim 1; and a liquid crystal panel.

7. A reflective type liquid crystal display comprising:

a reflective plate according to claim 2; and a liquid crystal panel.

8. A reflective type liquid crystal display comprising:

a reflective plate according to claim 3; and a liquid crystal panel.

9. A reflective type liquid crystal display comprising:

a reflective plate according to claim 4; and a liquid crystal panel.

10. A reflective type liquid crystal display comprising:

a reflective plate according to claim 5; and a liquid crystal panel.

11. The reflective plate according to claim 1, wherein the heights of the convexes and the depths of the concaves are not uniform.

* * * * *